(12) United States Patent
Itaya

(10) Patent No.: US 11,237,535 B2
(45) Date of Patent: Feb. 1, 2022

(54) CENTRALIZED VOLTAGE CONTROLLER AND CENTRALIZED VOLTAGE CONTROL SYSTEM

(71) Applicant: Mitsubishi Electric Corporation, Tokyo (JP)

(72) Inventor: Nobuhiko Itaya, Tokyo (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/341,640

(22) PCT Filed: Oct. 31, 2016

(86) PCT No.: PCT/JP2016/082230
§ 371 (c)(1),
(2) Date: Apr. 12, 2019

(87) PCT Pub. No.: WO2018/078846
PCT Pub. Date: May 3, 2018

(65) Prior Publication Data
US 2019/0369583 A1    Dec. 5, 2019

(51) Int. Cl.
*G05B 19/042* (2006.01)
*G05B 9/02* (2006.01)
(Continued)

(52) U.S. Cl.
CPC .......... *G05B 19/0425* (2013.01); *G05B 9/02* (2013.01); *G05B 23/0205* (2013.01);
(Continued)

(58) Field of Classification Search
None
See application file for complete search history.

(56) References Cited

U.S. PATENT DOCUMENTS 5,136,233 A * 8/1992 Klinkenberg ..... H02J 13/00006
                                                    323/343
5,231,565 A * 7/1993 Bilas ................ H02H 3/00
                                                    700/22
(Continued)

FOREIGN PATENT DOCUMENTS

JP       08130883 A    5/1996
JP       11289663 A    10/1999
(Continued)

OTHER PUBLICATIONS

Extended European Search Report dated Oct. 2, 2019 for corresponding European patent application No. 16900370.0, 10 pages.
(Continued)

*Primary Examiner* — Bernard G Lindsay
(74) *Attorney, Agent, or Firm* — Buchanan Ingersoll & Rooney PC

(57) ABSTRACT

A centralized voltage controller connected, via a communication network, to local voltage control units controlling voltage controllers, which are connected to a distribution line of a distribution system and control voltage of the distribution line, has: a voltage distribution determination unit calculating a controlled amount for each first voltage controller to be controlled among the plurality of voltage controllers, based on a measured value of voltage at each point of the distribution line; a tap position determination unit generating a command value to be given to each local voltage control unit based on the controlled amount; and a control state determination unit determining whether each voltage controller is a second voltage controller that fails to perform control according to the command value, and setting the voltage controllers except the second voltage controller to be the first voltage controller.

9 Claims, 10 Drawing Sheets

(51) Int. Cl.
*G05B 23/02* (2006.01)
*G05F 1/153* (2006.01)
*G05F 1/66* (2006.01)
*H02J 3/12* (2006.01)
*H02J 13/00* (2006.01)

(52) U.S. Cl.
CPC ............... *G05F 1/153* (2013.01); *G05F 1/66* (2013.01); *H02J 3/12* (2013.01); *H02J 13/0006* (2013.01)

(56) References Cited

U.S. PATENT DOCUMENTS

| | | | | |
|---|---|---|---|---|
| 2009/0034418 | A1* | 2/2009 | Flammer, III | H04W 40/248 370/238 |
| 2010/0001700 | A1* | 1/2010 | Santos | H02J 3/1878 323/256 |
| 2013/0018516 | A1* | 1/2013 | Chee | H02J 3/381 700/287 |
| 2014/0288725 | A1 | 9/2014 | Itaya | |
| 2015/0340862 | A1 | 11/2015 | Kobayashi et al. | |
| 2015/0346286 | A1* | 12/2015 | Janssen | H02J 3/00 702/58 |
| 2016/0146191 | A1* | 5/2016 | Gil | F03D 9/255 290/44 |
| 2019/0027935 | A1* | 1/2019 | Maleka | G01R 19/2506 |

FOREIGN PATENT DOCUMENTS

| | | |
|---|---|---|
| JP | 2003259553 A | 9/2003 |
| JP | 5958869 B2 | 7/2016 |
| WO | 2013065114 A1 | 5/2013 |

OTHER PUBLICATIONS

International Search Report (PCT/ISA/210) dated Dec. 6, 2016, by the Japan Patent Office as the International Searching Authority for International Application No. PCT/JP2016/082230.

Japanese Office Action (Notification of Reasons for Refusal) dated Feb. 27, 2017, issued in the corresponding Japanese Patent Application No. 2017-505679.

Written Opinion (PCT/ISA/237) dated Dec. 6, 2016, by the Japan Patent Office as the International Searching Authority for International Application No. PCT/JP2016/082230.

* cited by examiner

FIG.6

| LOCAL VOLTAGE CONTROL UNIT | TAP POSITION |
|---|---|
| 11 | 1 |
| 15 | 2 |
| ⋮ | ⋮ |

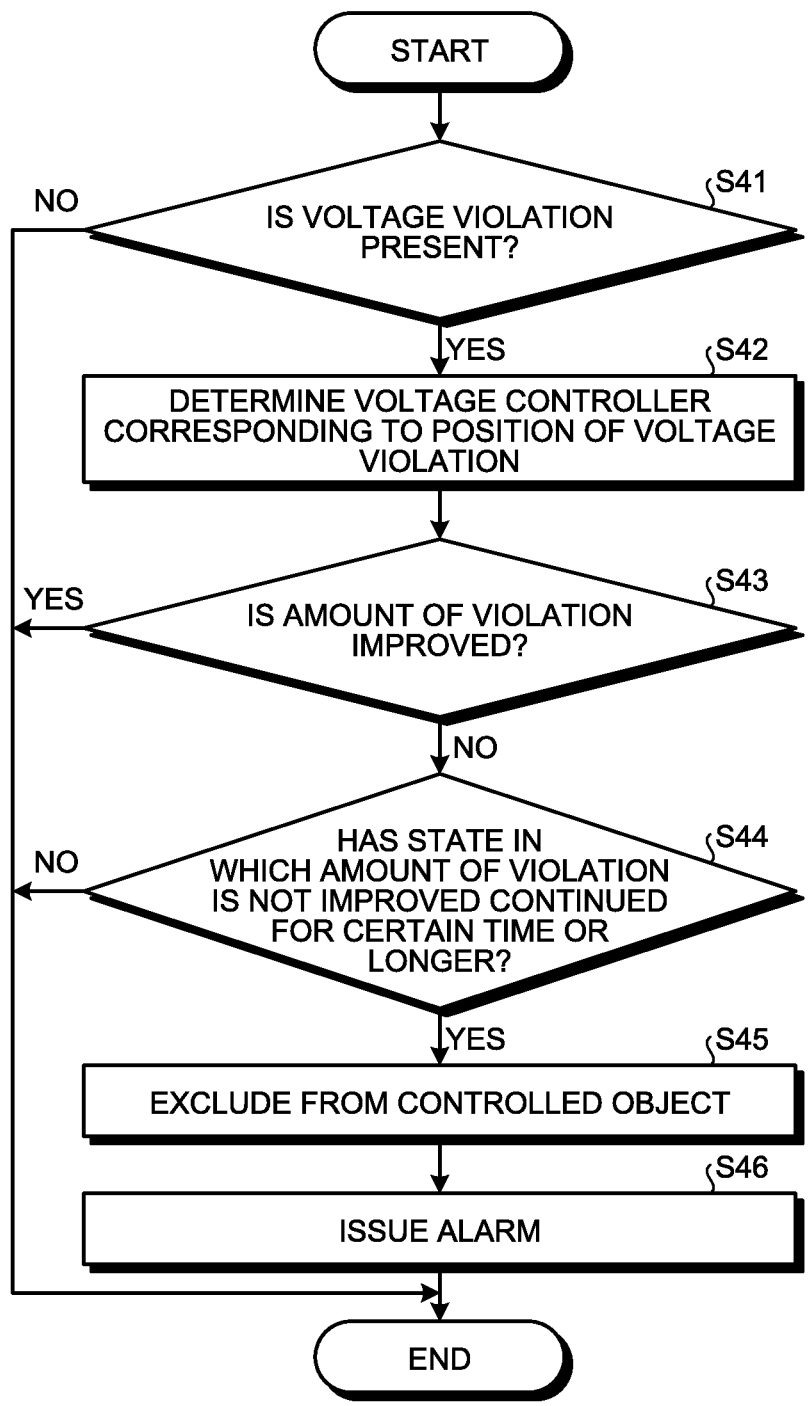

CENTRALIZED VOLTAGE CONTROLLER AND CENTRALIZED VOLTAGE CONTROL SYSTEM

FIELD

The present invention relates to a centralized voltage controller and a centralized voltage control system for controlling voltage of a distribution system.

BACKGROUND

A distribution system is typically composed of a high voltage system and a low voltage system, where a receiving end of a general customer is connected to the low voltage system. An electric utility is obligated to maintain the voltage at the receiving end of the general customer within a proper voltage range. In the case of electricity reception of 100 V, for example, the electric utility is obligated to maintain the voltage between 95 V and 107 V. For this obligation, the electric utility regulates a controlled amount of a voltage controller connected to the high voltage system so as to maintain the voltage at the receiving end of the general customer. Note that in the following description, the distribution system refers to a high voltage system unless otherwise specified.

In the field of conventional voltage control of the distribution system, a local voltage control unit is widely available, the local voltage control unit performing autonomous decentralized voltage control on the voltage controller on the basis of measured information near the installation point of the voltage controller, and being integrated with the voltage controller or installed alongside the voltage controller.

In recent years, load distribution of the distribution system has shown a trend toward large nonuniform fluctuation with time due to the diversification of way to use electricity, the spread of dispersion type electric power sources including one based on solar power generation, or the like. In response to this situation, it is becoming difficult to maintain proper voltage in the conventional voltage control of the distribution system.

For that reason, a method that performs centralized control on the voltage of the distribution system to achieve consistency across the system (hereinafter referred to as a centralized control method) is proposed in place of the autonomous decentralized voltage control method. For example, Patent Literature 1 discloses a technique in which a central unit that is a centralized voltage controller calculates an amount of adjustment for a local unit that is a voltage controller situated in the distribution system, and transmits the amount of adjustment as a control signal to each local unit.

CITATION LIST

Patent Literature

Patent Literature 1: Japanese Patent Application Laid-open No. H11-289663

SUMMARY

Technical Problem

However, according to the above conventional technique, the voltage controller does not perform proper control in some cases even when a proper control signal is transmitted to each voltage controller by the centralized voltage controller. Examples of factors causing the voltage controller to fail to perform proper control include an instance where the voltage controller has reached the control limit, a failure of the voltage controller, a failure of a local voltage control unit connected to the voltage controller, a failure of a communication line between the centralized voltage controller and the local voltage control unit, and the like. The instance where the voltage controller has reached the control limit refers to, for example, a state in which a voltage controller of a transformer type has reached the upper limit or lower limit of the tap value, or a state in which a voltage controller of a reactive power regulation type outputs the maximum reactive power in capacity.

In the case where the voltage controller does not perform proper control, a voltage violation of the distribution system is not resolved even when the centralized voltage controller transmits the control signal. Even when another voltage controller has the possibility of resolving the voltage violation, the centralized voltage controller calculates the amount of adjustment to eliminate the voltage violation using the voltage controller that does not perform proper control, thereby experiencing a problem that the voltage violation is prolonged as a result.

The present invention has been made in view of the above circumstances, and an object of the present invention is to provide a centralized voltage controller that can prevent prolongation of a voltage violation.

Solution to Problem

In order to solve the above problems and achieve the object, the present invention provides a centralized voltage controller that is connected, via a communication network, to a plurality of local voltage control units controlling a plurality of voltage controllers, respectively, which is connected to a distribution line of a distribution system and controls voltage of the distribution line. The centralized voltage controller comprises a calculation unit to calculate a controlled amount for each first voltage controller that is a voltage controller to be controlled among the plurality of voltage controllers, on the basis of a measured value of voltage at each point of the distribution line, and a generation unit to generate a command value to be given to each of the plurality of local voltage control units on the basis of the controlled amount. The centralized voltage controller further comprises a determination unit to determine whether or not each of the plurality of voltage controllers is a second voltage controller that is a voltage controller that fails to perform control according to the command value, and set the plurality of voltage controllers except the second voltage controller to be the first voltage controller.

Advantageous Effects of Invention

The centralized voltage controller according to the present invention has an advantageous effect of being able to prevent prolongation of a voltage violation.

BRIEF DESCRIPTION OF DRAWINGS

FIG. 6 is a table illustrating an example of the structure of tap position information of the first embodiment.

FIG. 11 is a flowchart illustrating an example of a procedure of control state determination processing performed by a control state determination unit of the second embodiment.

DESCRIPTION OF EMBODIMENTS

A centralized voltage controller and a centralized voltage control system according to embodiments of the present invention are now described in detail with reference to the drawings. Note that the present invention is not necessarily limited by these embodiments.

First Embodiment

Figure 1:
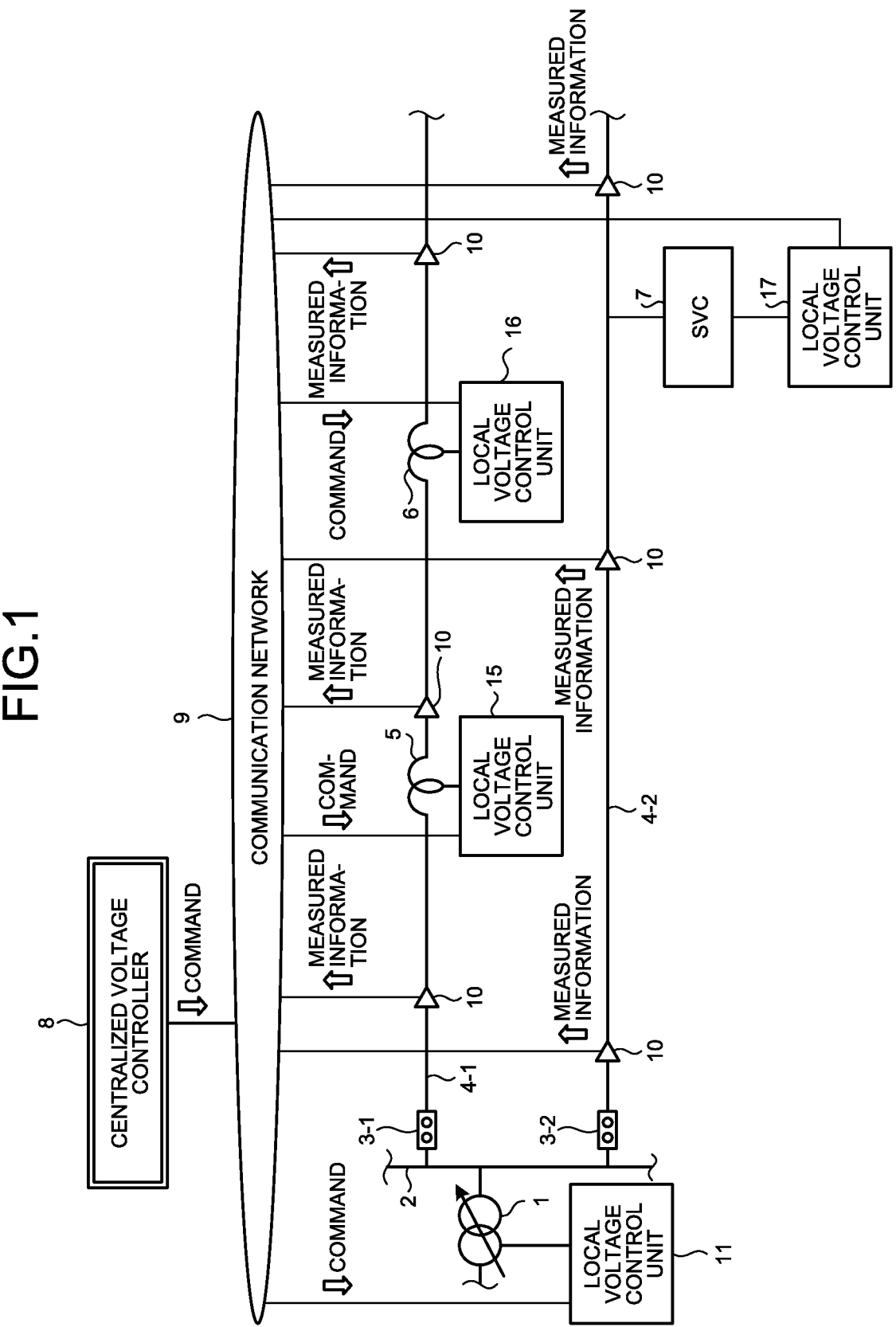
FIG. 1 is a diagram illustrating an example of the configuration of a centralized voltage control system according to a first embodiment.

FIG. 1 is a diagram illustrating an example of the configuration of a centralized voltage control system according to a first embodiment of the present invention. A voltage controller 1 in FIG. 1 is of a transformer type and is, for example, an LRT (load ratio control transformer: on-load tap changer type transformer) as a distribution transformer installed in an electrical substation. A local voltage control unit 11 is connected to the voltage controller 1 and controls the voltage controller 1. The local voltage control unit 11 can be integrated with or installed alongside the voltage controller 1. The local voltage control unit 11 controls the voltage controller 1 by adjusting a controlled amount of the voltage controller 1, specifically, by adjusting a tap position thereof. The local voltage control unit 11 also has a communication function and is connected to a communication network 9.

A secondary side of the voltage controller 1 is connected with a bus line 2. Two distribution lines 4-1 and 4-2 are connected in parallel to the bus line 2. The distribution lines 4-1 and 4-2 are distribution lines of a high voltage system.

The distribution line 4-1 has one end connected to the bus line 2 via a circuit breaker 3-1. At a number of points on the distribution line 4-1, voltage flow measuring devices 10 that are each a high-voltage side measuring device are installed, respectively, the voltage flow measuring device measuring the voltage and power flow of the distribution line 4-1. That is, the voltage flow measuring device 10 is connected to the distribution line 4-1, measures the voltage and power flow at its point of connection, and outputs a result obtained by processing the measured value in, for example, statistical processing or the like, as measured information. The voltage flow measuring device 10 has a communication function and is connected to the communication network 9. The voltage flow measuring device 10 transmits the measured information that is the result of measurement of the voltage and power flow to a centralized voltage controller 8 via the communication network 9, for example, on a regular basis. A cycle during which the voltage flow measuring device 10 transmits the measured information is one minute, for example. The centralized voltage controller 8 determines a targeted voltage distribution and an operating state of each voltage controller by which the targeted voltage distribution is obtained, regarding a target system range, and accordingly gives a command value to each voltage controller. Note that the centralized voltage controller 8 may be installed at a service office, a control station, or the like that takes charge of the target system range.

Voltage controllers 5 and 6 that are step voltage regulators (SVRs), which are transformer type voltage controllers, are also connected on the distribution line 4-1. A local voltage control unit 15 controlling the voltage controller 5 is connected to the voltage controller 5. The local voltage control unit 15 can be integrated with or installed alongside the voltage controller 5. The local voltage control unit 15 controls the voltage controller 5 by adjusting a controlled amount of the voltage controller 5, specifically, by adjusting a tap position thereof. Likewise, a local voltage control unit 16 controlling the voltage controller 6 is connected to the voltage controller 6. The local voltage control unit 16 controls the voltage controller 6. The local voltage control units 15 and 16 also have a communication function and are connected to the communication network 9.

The local voltage control units controlling the transformer type voltage controllers, that is, the local voltage control units 11, 15, and 16 may be local voltage control units that can transmit the tap positions set in the voltage controllers to be controlled by the units, or may be local voltage control units that do not transmit the tap positions set in the voltage controllers to be controlled by the units. Among the local voltage control units 11, 15, and 16, some may be local voltage control unit or units that can transmit the tap position while the rest may be local voltage control unit or units that do not transmit the tap position. That is, the local voltage control units 11, 15, and 16 that correspond to a plurality of local voltage control units may include a first unit as a local voltage control unit that transmits the tap position set in the voltage controller to be controlled to the centralized voltage controller 8, and a second unit as a local voltage control unit that does not transmit the tap position set in the voltage controller to be controlled to the centralized voltage controller 8. When transmitting the tap positions, the local voltage control units 11, 15, and 16 transmit the tap positions to the centralized voltage controller 8 with a period of one minute, for example. The period for transmitting the tap position is not limited to one minute.

A voltage controller 7 that is a static var compensator (SVC) is connected to the distribution line 4-2. A local voltage control unit 17 controlling the voltage controller 7 is connected to the voltage controller 7. The local voltage control unit 17 can be integrated with or installed alongside the voltage controller 7, for example. The local voltage control unit 17 controls the voltage controller 7 by adjusting a controlled amount of the voltage controller 7, specifically, by adjusting reactive power output thereof.

One end of the distribution line 4-2 is connected to the bus line 2 via a circuit breaker 3-2. As with the distribution line 4-1, the voltage flow measuring device 10 is installed at each of a number of points on the distribution line 4-2, the device 10 measuring the voltage and power flow of the distribution line 4-2.

Although not illustrated in FIG. 1, a low voltage distribution line is connected with a load, and it is further connected with dispersion type power sources such as an electrical generator including a solar power generator and a storage battery. However, the present embodiment can be applied even when any dispersion type power source is not connected to the low voltage distribution line. Hereinafter, voltage control of the distribution system means voltage control of the high voltage system.

Note that although the number of distribution lines connected to the bus line 2 is two in the example of configuration illustrated in FIG. 1, the number of distribution lines in the high voltage system is not limited to two. Moreover, the number of voltage controllers installed and the number of voltage flow measuring devices 10 are not limited to those in the illustrated example. Furthermore, although the configuration in FIG. 1 illustrates the example in which a voltage controller of a reactive power regulation type is included as the voltage controller to be controlled by the centralized voltage controller 8, a voltage controller of a reactive power regulation type need not be included as the voltage controller to be controlled by the centralized voltage controller 8.

The centralized voltage controller 8 is connected to each of the local voltage control units 11, 15, 16, and 17 and the voltage flow measuring devices 10 via the communication network 9. The communication network 9 is a dedicated network, for example, and is provided for the purpose of monitoring and controlling the distribution system. That is, the centralized voltage controller 8 is connected to the plurality of local voltage control units via the communication network 9, the local voltage control units controlling the voltage controllers that are connected to the distribution lines of the high voltage system to control the voltage of the distribution lines. On the basis of the measured information transmitted from the voltage flow measuring devices 10, the centralized voltage controller 8 determines the controlled amount controlled by each local voltage control unit with a centralized voltage control period and gives a command of, that is, transmits, the controlled amount to each local voltage control unit individually via the communication network 9. In this way, the centralized voltage controller 8 controls the voltage controllers controlling the voltage of the high voltage distribution lines. The centralized voltage control period may be set to any value, but it is set to two minutes in the following example for description. The centralized voltage controller 8 determines the tap positions for the local voltage control units controlling the voltage controllers of a transformer type, that is, for the local voltage control units 11, 15, and 16 in the example of FIG. 1, and gives command values based on the determined tap positions. In the present embodiment, the command value given to the local voltage control unit controlling the voltage controller of a transformer type is a change amount in the tap position. The centralized voltage controller 8 further gives an amount of reactive power as a command value to the local voltage control unit controlling the voltage controller of a reactive power regulation type, that is, to the local voltage control unit 17 in the example of FIG. 1.

Note that the centralized voltage controller 8 may be adapted not to give the command value when the tap position determined for every centralized voltage control period is not different from the command value given the last time. Alternatively, when the tap position determined for every centralized voltage control period is not different from the tap position calculated the last time, the centralized voltage controller 8 may give zero as a command value, or a change amount in the tap position.

Each local voltage control unit controlling the voltage controller of a transformer type controls the voltage controller on the basis of the command from the centralized voltage controller 8. Specifically, each local voltage control unit changes the tap position on the basis of the change amount in the tap position commanded from the centralized voltage controller 8. Each local voltage control unit does not change the tap position when the change amount in the tap position is zero.

Figure 2:
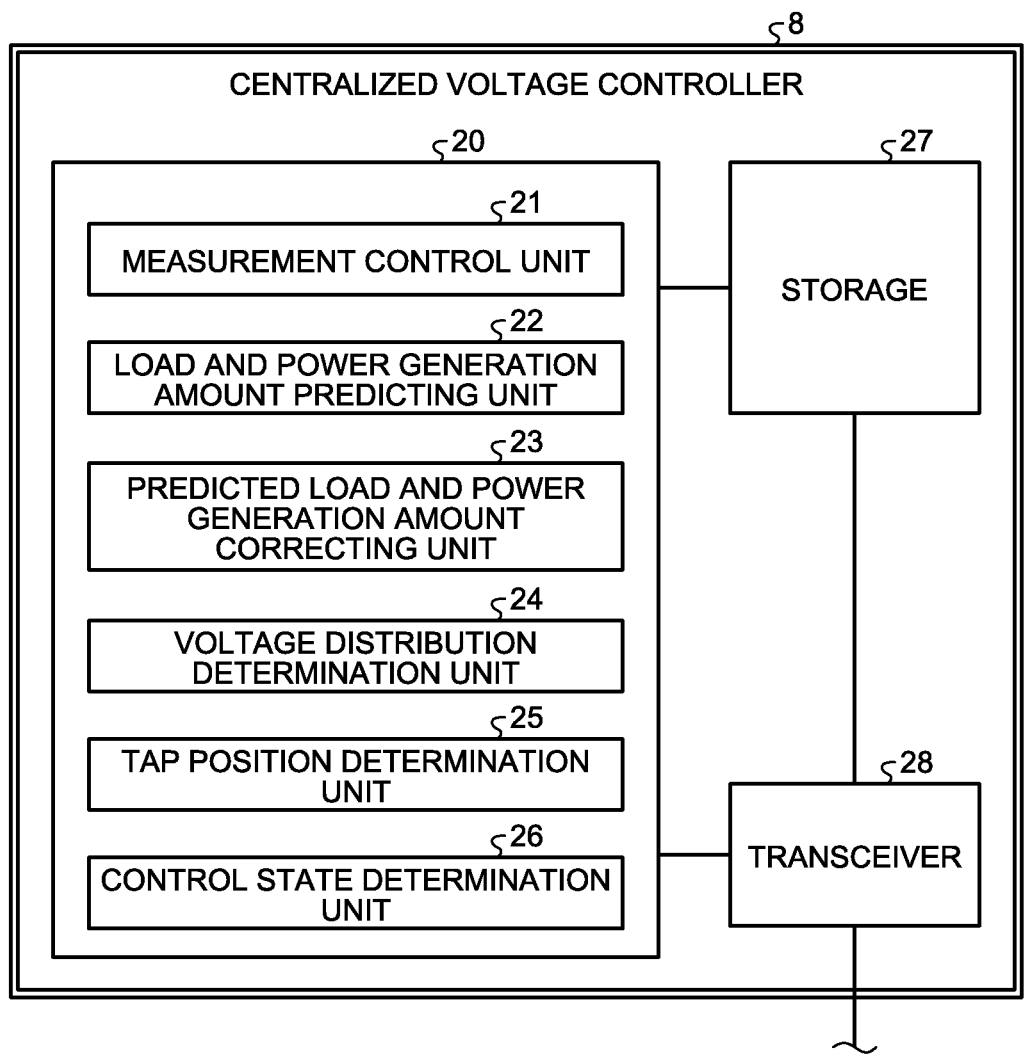
FIG. 2 is a diagram illustrating an example of the configuration of a centralized voltage controller of the first embodiment.

FIG. 2 is a diagram illustrating an example of the configuration of the centralized voltage controller 8. As illustrated in FIG. 2, the centralized voltage controller 8 includes a control unit 20, a storage 27, and a transceiver 28 that is connected to the control unit 20, the storage 27, and the communication network 9 to communicate with each local voltage control unit.

The control unit 20 includes a measurement control unit 21, a load and power generation amount predicting unit 22, a predicted load and power generation amount correcting unit 23, a voltage distribution determination unit 24, a tap position determination unit 25, and a control state determination unit 26. The measurement control unit 21 stores the measured information received from the voltage flow measuring device 10 in the storage 27 and outputs the measured information to the predicted load and power generation amount correcting unit 23. The load and power generation amount predicting unit 22 predicts the load and power generation amount distribution of the distribution system for a determined period in the future such as the next day as a profile for each hour, for example. The load and power generation amount corresponds to an amount obtained by subtracting the amount of power generation from a raw load. The load and power generation amount is the amount of load when it has a positive value, but is the amount of power generation when it has a negative value. Note that details of a method of predicting the load and power generation amount distribution will be described later. The predicted load and power generation amount correcting unit 23 corrects a predicted value of the load and power generation amount distribution within a period of the centralized voltage control period on the basis of a result of comparison between an actual value of the load and power generation amount distribution within the immediately previous period of the centralized voltage control period and a predicted value of the load and power generation amount distribution within that period. Here, the actual value of the load and power generation amount distribution is calculated on the basis of the measured information.

The voltage distribution determination unit 24 performs a power flow calculation on the basis of the thus-corrected predicted value of the load and power generation amount distribution, and uses the measured information stored in the storage 27 to search for the best solution for making a value of an evaluation function that evaluates the voltage distribution of the distribution system to be the best, thereby to determine an optimum voltage distribution within the period of the centralized voltage control period and an optimum controlled amount for each voltage controller. That is, on the basis of a measured voltage value at each point of the distribution line, the voltage distribution determination unit 24 that is a calculation unit calculates the controlled amount for each first voltage controller, which is the said voltage controller to be controlled among the said plurality of voltage controllers. Note that the optimum voltage distribution is a voltage distribution at each point of the system in which a constraint condition is satisfied and the evaluation function is optimal. The optimum controlled amount is a controlled amount commanded to each voltage controller to achieve the optimum voltage distribution. The optimum controlled amount for the local voltage control unit corresponding to the voltage controller of a reactive power regulation type is the amount of reactive power outputted by the voltage controller. The command value for the local voltage control unit corresponding to the voltage controller of a reactive power regulation type is the controlled amount itself. The optimum controlled amount for the local voltage control unit corresponding to the voltage controller of a transformer type is a tap position.

On the basis of the optimum voltage controlled amount, the tap position determination unit 25 determines a command value for the local voltage control unit corresponding to the voltage controller of a transformer type, and gives the command value to each local voltage control unit via the transceiver 28. The command value is a change amount in the tap position in the case of the local voltage control unit corresponding to the voltage controller of a transformer type. That is, the tap position determination unit 25 that is a generation unit generates a command value given to each of the local voltage control units on the basis of the controlled amount. As described later, the storage 27 stores the tap position currently set in the voltage controller of a transformer type for each local voltage control unit corresponding to the transformer type voltage controller. The tap position determination unit 25 determines a change amount in the tap position on the basis of a difference between the optimum controlled amount and the tap position stored in the storage 27 for each local voltage control unit corresponding to the voltage controller of a transformer type. The tap position stored in the storage 27 is a tap position received from the local voltage control unit if the local voltage control unit is capable of transmitting the tap position. As for the local voltage control unit that does not transmitting the tap position, the tap position stored in the storage 27 is a neutral position by default, and is updated according to the command value each time the command value is transmitted.

On the basis of the command value determined by the tap position determination unit 25, the control state determination unit 26 determines whether or not each voltage controller is normal, and when determining that it is not normal, excludes a voltage controller determined not to be normal from the controlled object. That is, the control state determination unit 26 that is a determination unit determines whether or not each of the voltage controllers is a second voltage controller that is a voltage controller not performing control according to the command value, and sets the voltage controllers other than the second voltage controller to be the first voltage controllers.

The storage 27 stores upper and lower limit values of the high-voltage proper voltage range at each point of the distribution system. The storage 27 also stores a control limit of each voltage controller connected to the distribution system. Moreover, as described above, the storage 27 stores the tap position for each local voltage control unit corresponding to the voltage controller of a transformer type.

Figure 3:
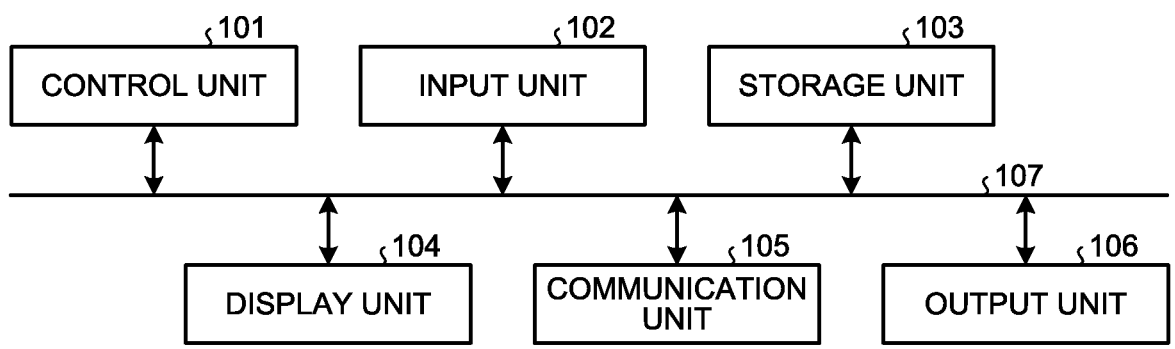
FIG. 3 is a diagram illustrating an example of the configuration of a computer system of the first embodiment.

The centralized voltage controller 8 is specifically a computer system, that is, a computer. The computer system functions as the centralized voltage controller 8 when a centralized voltage control program is run on the computer system. FIG. 3 is a diagram illustrating an example of the configuration of the computer system of the present embodiment. As illustrated in FIG. 3, the computer system includes a control unit 101, an input unit 102, a storage unit 103, a display unit 104, a communication unit 105, and an output unit 106, which are connected to each other via a system bus 107.

In FIG. 3, the control unit 101 is a processor such as a central processing unit (CPU), and executes the centralized voltage control program of the present embodiment. The input unit 102 includes a keyboard and a mouse, for example, and is used by a user of the computer system to input various kinds of information. The storage unit 103 includes various kinds of memories based on a random access memory (RAM) and a read only memory (ROM) as well as a storage device such as a hard disk, and stores a program to be executed by the control unit 101, necessary data obtained in the course of processing, and the like. The storage unit 103 is also used as a temporary storage area for the program. The display unit 104 is constructed of a display, a liquid crystal display (LCD) panel, or the like and displays various kinds of screens to the user of the computer system. The communication unit 105 is a set of transmitter and receiver that carries out communication processing. Note that FIG. 3 illustrates an example and the configuration of the computer system is not limited to the example of FIG. 3.

Here, a description will be given of an example of the operation of the computer system until the centralized voltage control program of the present embodiment is executable. The centralized voltage control program is installed to the storage unit 103 of the computer system having the above configuration from, for example, a Compact Disc (CD)-ROM or a Digital Versatile Disc (DVD)-ROM set in a CD-ROM or DVD-ROM drive not illustrated. When executed, the centralized voltage control program read from the storage unit 103 is stored in a predetermined location of the storage unit 103. In this state, the control unit 101 executes centralized voltage control processing of the present embodiment according to the program stored in the storage unit 103.

Note that although the present embodiment provides the program describing the centralized voltage control processing in the CD-ROM or DVD-ROM as a recording medium, use may be made of the program provided through a transmission medium such as the Internet via the communication unit 105, for example, depending on the configuration of the computer system, the size of the program provided, and the like.

The control unit 20 illustrated in FIG. 2 is implemented by the control unit 101 in FIG. 3. The storage 27 illustrated in FIG. 2 is a part of the storage unit 103 illustrated in FIG. 3. The transceiver 28 illustrated in FIG. 2 corresponds to the communication unit 105 illustrated in FIG. 3.

Figure 4:
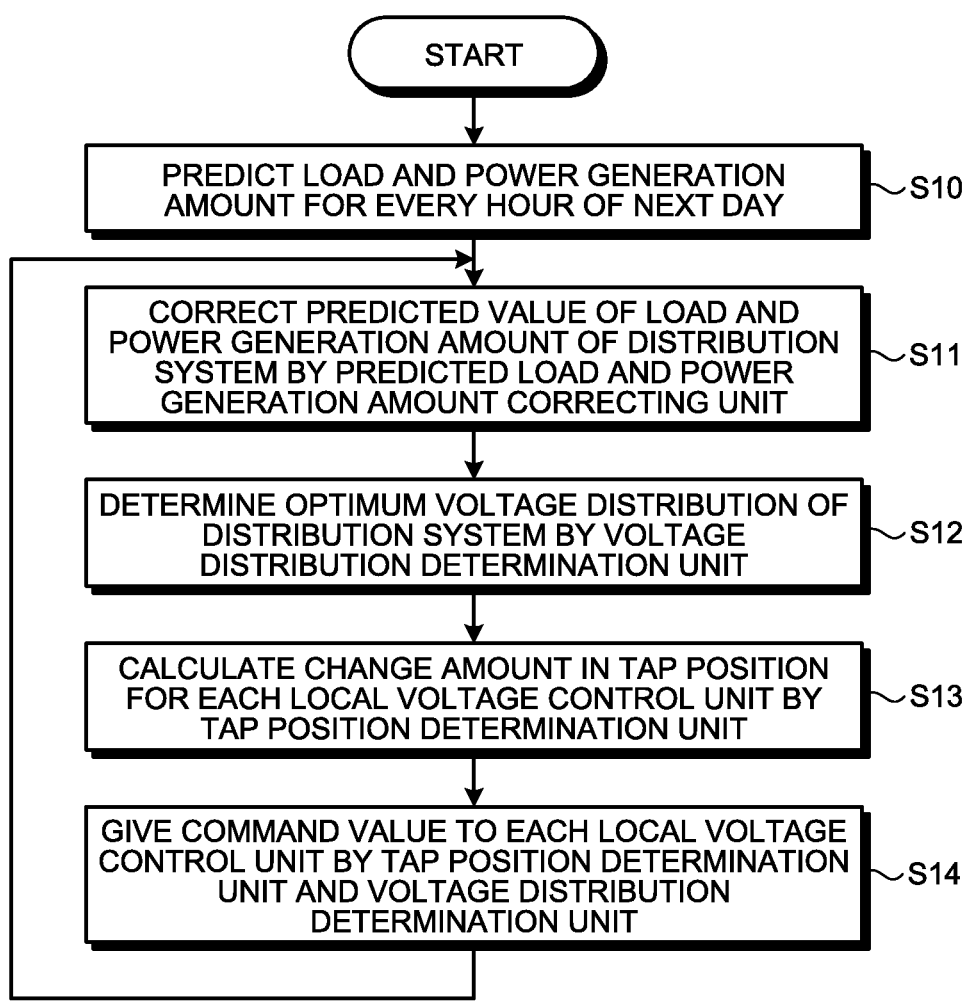
FIG. 4 is a flowchart illustrating an example of a centralized voltage control processing procedure of the first embodiment.

Next, centralized voltage control by the centralized voltage controller 8 of the present embodiment will be described. FIG. 4 is a flowchart illustrating an example of a centralized voltage control processing procedure of the present embodiment. In the present embodiment, a future load and power generation amount distribution of the distribution system is predicted for each day. Note that although a future load and power generation amount distribution of the distribution system is predicted every day in the example described herein, the future load and power generation amount distribution of the distribution system may be predicted every half day or every few days instead of every day. Here, the future load and power generation amount distribution of the distribution system is predicted every day.

As illustrated in FIG. 4, the load and power generation amount predicting unit 22 predicts the load and power generation amount distribution of the distribution system for every hour of the next day, for example, and a short period variation thereof from the load and power generation amount data at each point of the distribution system stored in the storage 27 (step S10). Note that the load and power generation amount predicting unit 22 obtains the load and power generation amount at each point of the distribution system by taking a difference between average values of the power flow in adjacent measurement points on the basis of the measured information received from the voltage flow measuring device 10, which is received in the past and stored in the storage 27. The load and power generation amount at each point of the distribution system is stored in the storage 27 as the load and power generation amount data. The load and power generation amount data is updated as appropriate on the basis of the measured information. The load and power generation amount data need not be calculated on the basis of the measured information, but may be determined on the basis of a model that is calculated based on facility data indicating which facility and load are disposed in which part or parts of the distribution line, a contract demand corresponding to each load, and/or the panel capacity of a solar power plant, for example.

The load and power generation amount predicting unit 22 collects actual load amounts for two or more days, for example, and obtains in advance a correlation between the load amount and air temperature in the same time period for each day of the week or each of weekday/holiday categories. This correlation is held by means of a relational expression obtained by a regression analysis or the like, or a table, or by other means like that. Then, from the correlation and a predicted air temperature for the next day, the load and power generation amount predicting unit 22 predicts the load amount at each point of the distribution system for each hour of the next day. As for the power generation amount of the next day, theoretical power generation amount based on prediction of weather for the next day is used, and the load and power generation amount predicting unit 22 subtracts the predicted power generation amount from the predicted load amount to produce the load and power generation amount data at each point of the distribution system for every hour of the next day.

Next, the predicted load and power generation amount correcting unit 23 corrects the predicted value of the load and power generation amount of the distribution system (step S11). Specifically, the predicted load and power generation amount correcting unit 23 compares an average value of the load and power generation amount at each point of the distribution system in a past determined time period between an actual value and a predicted value calculated on the basis of the measured information received from the voltage flow measuring device 10 in the most recent determined time period to obtain a ratio between the actual value and the predicted value, and multiplies the predicted value of the load and power generation amount in a future determined time period by the ratio, so as to correct the predicted value of the load and power generation amount at each point of the system in the future determined time period. The determined time period corresponds to a centralized voltage control period, for example.

Next, the voltage distribution determination unit 24 determines the optimum voltage distribution of the distribution system in the future determined time period on the basis of the predicted value of the load and power generation amount at each point of the distribution system, which has been produced in step S11 (step S12). Note that the processing of correcting the predicted value of the load and power generation amount in step S11 may be omitted, and the voltage distribution determination unit 24 may determine the optimum voltage distribution of the distribution system for a determined time in the future on the basis of the predicted value of the load and power generation amount at each point of the distribution system for the next day, which has been produced in step S10.

Next, on the basis of the controlled amount, namely the optimum controlled amount, which is used as a basis for calculation of the optimum voltage distribution of the distribution system, the tap position determination unit 25 calculates a change amount in the tap position, which is a command value given to each local voltage control unit in the future determined time period (step S13).

The tap position determination unit 25 and the voltage distribution determination unit 24 then give the command value to each local voltage control unit controlling the voltage controller (step S14), and returns to step S11. Specifically, the tap position determination unit 25 and the voltage distribution determination unit 24 transmit the command value to each local voltage control unit via the transceiver 28. As described above, the command value for each local voltage control unit controlling the voltage controller of a reactive power regulation type is the amount of reactive power, whereas the command value for each local voltage control unit controlling the voltage controller of a transformer type is the change amount in the tap position. Steps S11 to S14 are repeated for each centralized voltage control period.

Figure 5:
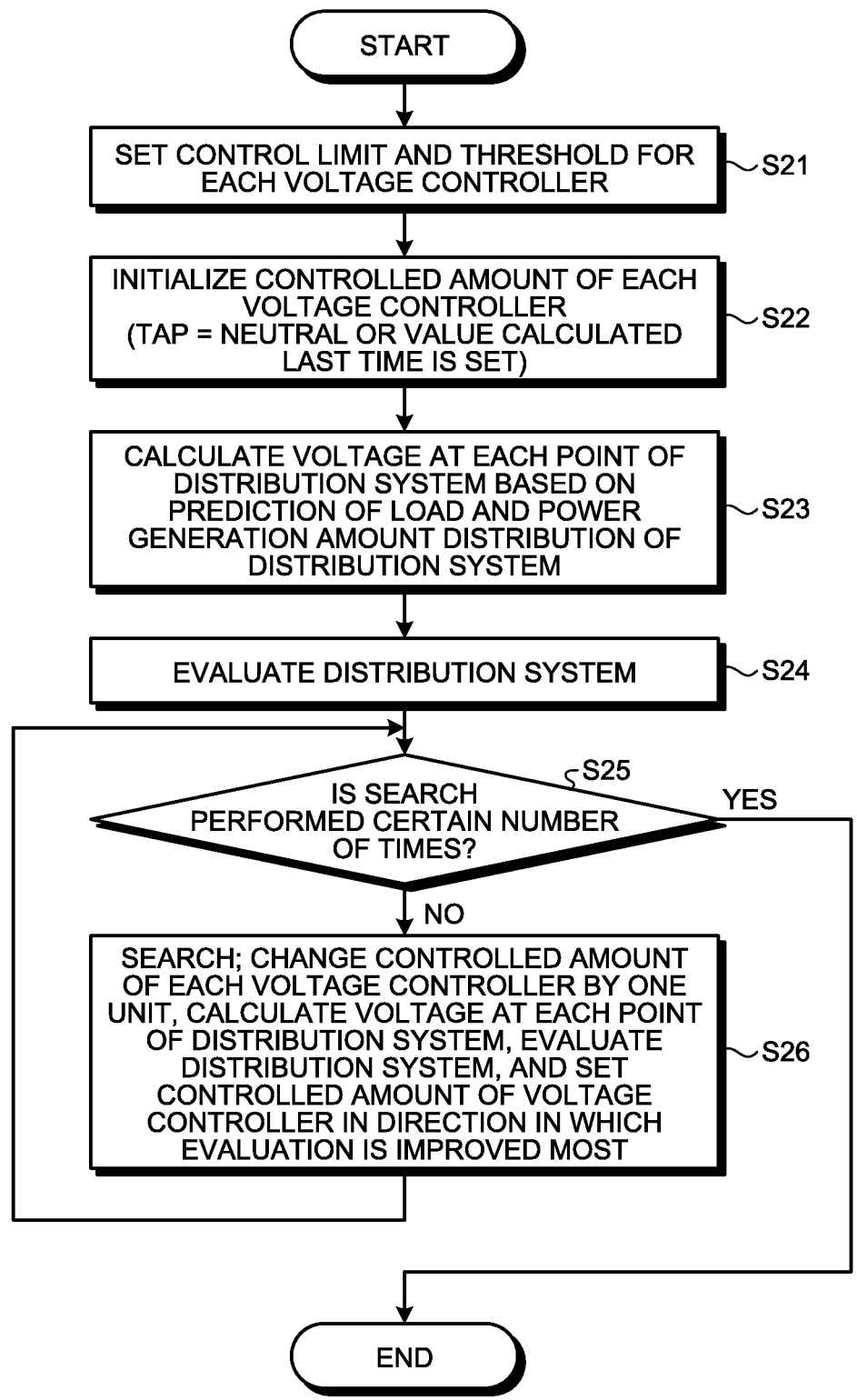
FIG. 5 is a flowchart for explaining details of processing in step S12 of FIG. 4.

Next, the details of the processing in step S12 of FIG. 4 will be described. FIG. 5 is a flowchart for explaining the details of the processing in step S12 of FIG. 4 and illustrates a flow for calculating the optimum voltage distribution of the distribution system in the future determined time period.

First, the voltage distribution determination unit 24 sets a control limit for each voltage controller, or when taking an example, sets tap upper and lower limits and a threshold for a voltage margin in the case of the voltage controller of a transformer type (step S21). Here, the control limit of each voltage controller is assumed to be stored in the storage 27. An arbitrary value can be set as the threshold for the voltage margin. The voltage distribution determination unit 24 also reads upper and lower limit values of the high-voltage proper voltage range for each point from the storage 27.

Next, the voltage distribution determination unit 24 initializes the controlled amount of each voltage controller (step S22). On this occasion, the voltage distribution determination unit 24 sets the controlled amount of the voltage controller to a calculated value obtained at the time when the optimum voltage distribution is calculated the last time, for example. Note that when there is no previous calculated value, the voltage distribution determination unit 24 sets, as the controlled amount, the tap position to be a neutral value for the voltage controller of a transformer type, or the amount of reactive power to be zero, for example, for the voltage controller of a reactive power regulation type.

Next, on the basis of the prediction about the load and power generation amount distribution at each point of the distribution system, the voltage distribution determination unit 24 performs power flow calculation with the set controlled amount of each voltage controller to calculate the voltage at each point of the distribution system (step S23).

The voltage distribution determination unit 24 then evaluates the distribution system on the basis of a result of the power flow calculation (step S24). Specifically, the voltage distribution determination unit 24 evaluates the distribution system by evaluating the evaluation function set for an evaluation item of the distribution system, that is, a value of an objective function. Here, the evaluation item given a first priority is an amount of violation, that is, an amount of deviation of the voltage at each point of the distribution system from the high-voltage proper voltage range (a high-voltage proper voltage upper limit value and a high-voltage proper voltage lower limit value). That is, the optimum voltage distribution is determined to minimize the sum total of the amount of violation of the voltage at each point of the distribution system from the proper voltage range in the first place.

The evaluation item given a second priority is, for example, a voltage margin at each point of the distribution system, that is, an amount of margin with respect to the high-voltage proper voltage upper/lower limit value. When each point of the distribution system has a small voltage margin, the voltage deviates from the proper voltage range with a slight voltage fluctuation and thereby the voltage controller may operate frequently. Thus, the larger the sum total of the voltage margin, the higher the evaluation. In a case of using an evaluation function showing an optimum when taking the minimum value, the voltage margin is evaluated using a voltage margin decrease amount defined as follows. The voltage margin decrease amount is calculated using the following expression (1) to be zero when the voltage margin is sufficiently large and to increase as the voltage margin decreases.

Voltage margin decrease amount=threshold−voltage margin, where voltage margin<threshold Voltage margin decrease amount=0, where voltage margin>=threshold (1)

The threshold is the value set in step S21, and is set to about 20% of the width of the proper voltage range, for example.

The case where the voltage margin<threshold and the voltage value is within the proper voltage range does not result in deviation from the proper voltage range, that is, a voltage violation, but results in a voltage margin violation, that is, a state in which the voltage margin for a short period variation is not secured, and therefore voltage margin>=threshold is desired.

The evaluation item given a third priority can be a sum total of the change amount in the controlled amount of the voltage controller from a default value thereof. Here, the change amount in the controlled amount of the voltage controller from the default value thereof is a difference in the tap position from a default tap position in the case of the voltage controller of a transformer type. Reduction in the sum total of the change amount leads to reduction in the number of times the voltage controller is operated.

The evaluation item given a fourth priority can be a transmission loss (active power loss+reactive power loss) of the entire distribution system. The smaller the transmission loss, the higher the evaluation. Note that the transmission loss consists mostly of the active power loss and its loss amount decreases as the voltage increases but accordingly the voltage margin on the upper limit side at each point of the distribution system given the second priority becomes smaller, and so the transmission loss is an evaluation item that is meaningful when the upper and lower voltage limit values at each point of the distribution system have considerable margins.

The evaluation function may be set for the evaluation item given the first priority, but it can be set for two or more of the items given the first to fourth priorities. In the latter case, the evaluation functions are weighted and summed to be an overall evaluation function. A higher order priority item can also be included in the evaluation function depending on the distribution system. The evaluation function can be constructed to be best optimized (highest evaluation) when taking the minimum value, for example.

For instance, when the evaluation function is set on the basis of all the evaluation items given the first to fourth priorities, the evaluation function can be defined as the following expression (2). "Wp", "W1", "W2", and "W3" are weight coefficients.

$$\begin{aligned}\text{Evaluation function value} = \quad & (2) \\ \text{sum total of violation amount of upper and lower voltage} & \\ \text{limits at each point of distribution system} \times Wp \; + & \\ \text{maximum value of voltage margin decrease amount on} & \\ \text{upper limit side at each point within a responsible} & \\ \text{voltage control range for each transformer} \times W1 \; + & \\ \text{maximum value of voltage margin decrease amount on} & \\ \text{lower limit side at each point within a responsible} & \\ \text{voltage control range for each transformer} \times W1 \; + & \\ \text{transformer target voltage change amount from previous} & \\ \text{command incidence} \times W2 + \text{transmission loss} \times W3 & \end{aligned}$$

Returning to the explanation of FIG. 5, the voltage distribution determination unit 24 determines whether or not a determined number of times of searches, that is, the search of step S26 is performed (step S25), and ends the processing if the search has been performed the determined number of times (Yes in step S25), but proceeds to processing of step S26 if the search is not performed the determined number of times (No in step S25).

Next, in step S26, the voltage distribution determination unit 24 changes the controlled amount of each voltage controller by, for example, one unit to calculate the voltage at each point of the distribution system as in step S23 and evaluate the distribution system as in step S24, and compares the evaluation results after carrying out the controlled-amount changing process for calculation and evaluation for all the voltage controllers, so as to set and change the controlled amount of the voltage controller so that the evaluation is improved most significantly (step S26). Changing the controlled amount by one unit means to raise or lower the tap by one step in a case of the voltage controller of a transformer type, or means to increase or decrease the amount of reactive power by a determined amount in a case of the voltage controller of a reactive power regulation type. For the optimization algorithm, a method disclosed in Japanese Patent Application Laid-open No. 2010-250599 or the like can be used, for example. The processing returns to step S25 after the execution of step S26.

As described above, after the predetermined number of searches, the voltage distribution determination unit 24 can determine the optimum voltage distribution of the distribution system and the optimum controlled amount of each voltage controller in the future determined time period as the best solution for optimizing the value of the evaluation function.

Next, the control state determination processing of the present embodiment will be described. As described above, the voltage controllers may fail to properly perform voltage control in some cases even when the centralized voltage controller 8 gives the controlled amount such that the above-mentioned evaluation function is minimized to each of the local voltage control units. Examples of factors causing the voltage controller not to perform proper control include a case where the voltage controller has reached the control limit, a failure of the voltage controller, a failure of a local voltage control unit connected to the voltage controller, a failure of a communication line between the centralized voltage controller and the local voltage control unit, and the like.

In such a case, the voltage violation may possibly continue for a long period of time if the centralized voltage controller 8 continues its centralized voltage control while regarding the voltage controller that does not properly perform control as the controlled object. In response to this situation, in the present embodiment, the centralized voltage controller 8 performs the control state determination processing that corresponds to a process for determining whether or not the voltage controllers of a transformer type perform proper control and excludes a voltage controller determined not to perform proper control from the object of the centralized voltage control. By performing the centralized voltage control while excluding the voltage controller determined not to perform proper control from the object of the centralized voltage control, voltage control with reducing the voltage violation using another voltage controller can be realized and it is possible to avoid the voltage violation from continuing for a long period of time.

Specifically, the centralized voltage controller 8 stores, in the storage 27, the current tap position for each local voltage control unit controlling the voltage controller of a transformer type, as the tap position information. FIG. 6 is a table illustrating an example of the structure of the tap position information. As illustrated in FIG. 6, the tap position information is composed of information for identifying the local voltage control unit and the tap position, that is, a tap position set in the voltage controller of a transformer type controlled by the local voltage control unit. For example, as illustrated in FIG. 6, "11" that is identification information indicating the local voltage control unit 11 and "1" that is a tap position are stored. This shows that the voltage controller 1 controlled by the local voltage control unit 11 has its tap position set in a first step.

In the case where each local voltage control unit transmits the tap position, the transmitted tap position is the tap position stored as tap information in the storage 27. Hence, these tap positions are ideally tap positions according to the command values given by the centralized voltage controller 8. However, there may be a case where any local voltage control unit does not transmit a tap position, and in this case the tap position recognized by the centralized voltage controller 8 may be potentially different from the actual tap position. Moreover, even the local voltage control unit adapted to transmit the tap position may not transmit a correct tap position due to some communication error, a failure of the unit, or the like. Also in the case where the voltage controller that fails to perform proper control exists as described above, the tap position recognized by the centralized voltage controller 8 may be possibly different from the actual tap position in terms of this fail voltage controller.

In such a case, the voltage violation may not be resolved even when the centralized voltage controller 8 transmits the command value based on the above optimum voltage distribution on the basis of the tap position corresponding to each local voltage control unit currently recognized by the centralized voltage controller 8. To address this situation, in the present embodiment, in a case where the centralized voltage controller 8 has got a calculation of the same command value as a result continuously a specified number of times or more for the local voltage control unit controlling the voltage controller of a transformer type, the voltage controller corresponding to that local voltage control unit is excluded from the controlled object. Steps S11 to S14 described above may be performed again immediately after the voltage controller is excluded from the controlled object, or may be performed in a next centralized voltage control period after the voltage controller is excluded from the controlled object.

Figure 7:
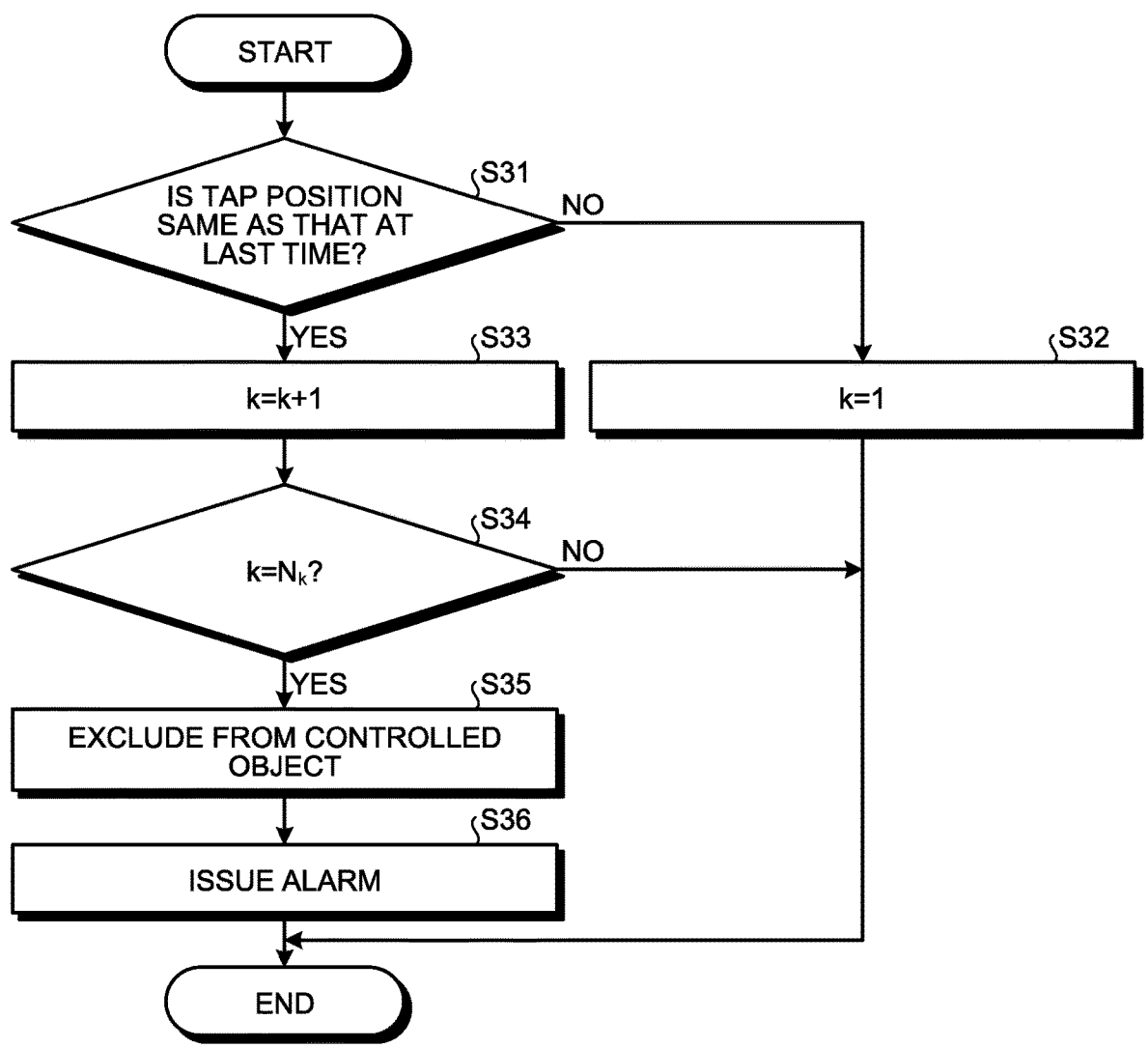
FIG. 7 is a flowchart illustrating an example of a procedure of control state determination processing performed by a control state determination unit of the first embodiment.

FIG. 7 is a flowchart illustrating an example of a procedure of the control state determination processing performed by the control state determination unit 26. Each time the command value is calculated by execution of steps S11 to S14 described above, the control state determination unit 26 acquires and holds the command value for each local voltage control unit from the tap position determination unit 25, and performs the processing illustrated in FIG. 7 for each local voltage control unit, or for each voltage controller. As illustrated in FIG. 7, the control state determination unit 26 determines whether or not the command value calculated by the tap position determination unit 25, that is, the change amount in the tap position is the same as that at the last time (step S31).

If the change amount in the tap position is not the same as that at the last time (No in step S31), the control state determination unit 26 sets "k" to "1" (step S32) and ends the processing. "k" is a variable that indicates the number of times the same command value is calculated continuously. If the change amount in the tap position is the same as that at the last time (Yes in step S31), the control state determination unit 26 substitutes "k+1" for "k" (step S33) and determines whether or not "k" equals "$N_k$" (step S34). "$N_k$" is a threshold set for the number of times the same command value is continuously calculated to identify the voltage controller that fails to perform proper control. That is, when the same command value is calculated "$N_k$" times continuously, a corresponding voltage controller is determined to fail to perform proper control. When the same command value is calculated less than "$N_k$" times continuously, a corresponding voltage controller is determined to perform proper control.

As a value of "$N_k$", five can be set, for example, but the value of "$N_k$" is not limited to five since the value of "$N_k$" is dependent on the centralized voltage control period as well and thus may be set appropriately depending on the centralized voltage control period. The number of times of change in the tap is reasonably made several to dozen times a day, so that the number of times of change in the tap up to about once per hour is considered normal. On the other hand, a case where the same command value is calculated five times continuously means that the tap value is changed five times for a period of ten minutes (centralized voltage control period of 2 minutes×5=10 minutes). The time from when each local voltage control unit receives the command value until when the tap value is reflected is typically within about one minute, so that the time taken for the change in the tap value to be reflected in the voltage at each point of the distribution system and received as the measured information by the centralized voltage controller 8 is considered to be within several minutes. Therefore, it can be determined that the control is not properly performed in the case where the command value for changing the tap value continues to be calculated during ten minutes. Each of the numerical values described above is an example, and the time from when the command value is received to when the tap value is reflected in the voltage at each of the points may vary depending on each distribution system, and the value of "$N_k$" may be set according to characteristics of the distribution system.

If "k" equals "$N_k$" (Yes in step S34), the control state determination unit 26 excludes the voltage controller from the controlled object (step S35), issues an alarm to an operator (step S36), and ends the processing. What is specifically contemplated as the alarm to the operator is an alarm by display of a screen indicating that the voltage controller excluded from the controlled object is abnormal, an alarm by sound indicating that the voltage controller excluded from the controlled object is abnormal, or the like. If "k" is not equal to "$N_k$" (No in step S34), the control state determination unit 26 ends the processing.

The control state determination unit 26 may handle the excluded voltage controller again as the controlled object when a specified time or longer has elapsed after the voltage controller is excluded from the controlled object in step S35.

By performing the above processing, the voltage controller that fails to properly perform control can be excluded from the controlled object. Note that the above example uses the number of times the same command value as a result is calculated continuously to determine the controller that fails to properly perform control, but instead, the controller that fails to properly perform control may be determined on the basis of whether or not the same command value continues to be calculated for a certain period of time or longer. That is, the control state determination unit 26 may set the voltage controller which has been determined to be the second voltage controller for a certain period of time as the first voltage controller.

As described above, in the present embodiment, when the number of times the same command value as a result has been calculated continuously is a threshold or more for the local voltage control unit controlling the voltage controller of a transformer type, the centralized voltage controller 8 excludes the corresponding voltage controller from the controlled object. This can prevent prolongation of the voltage violation.

Second Embodiment

Figure 8:
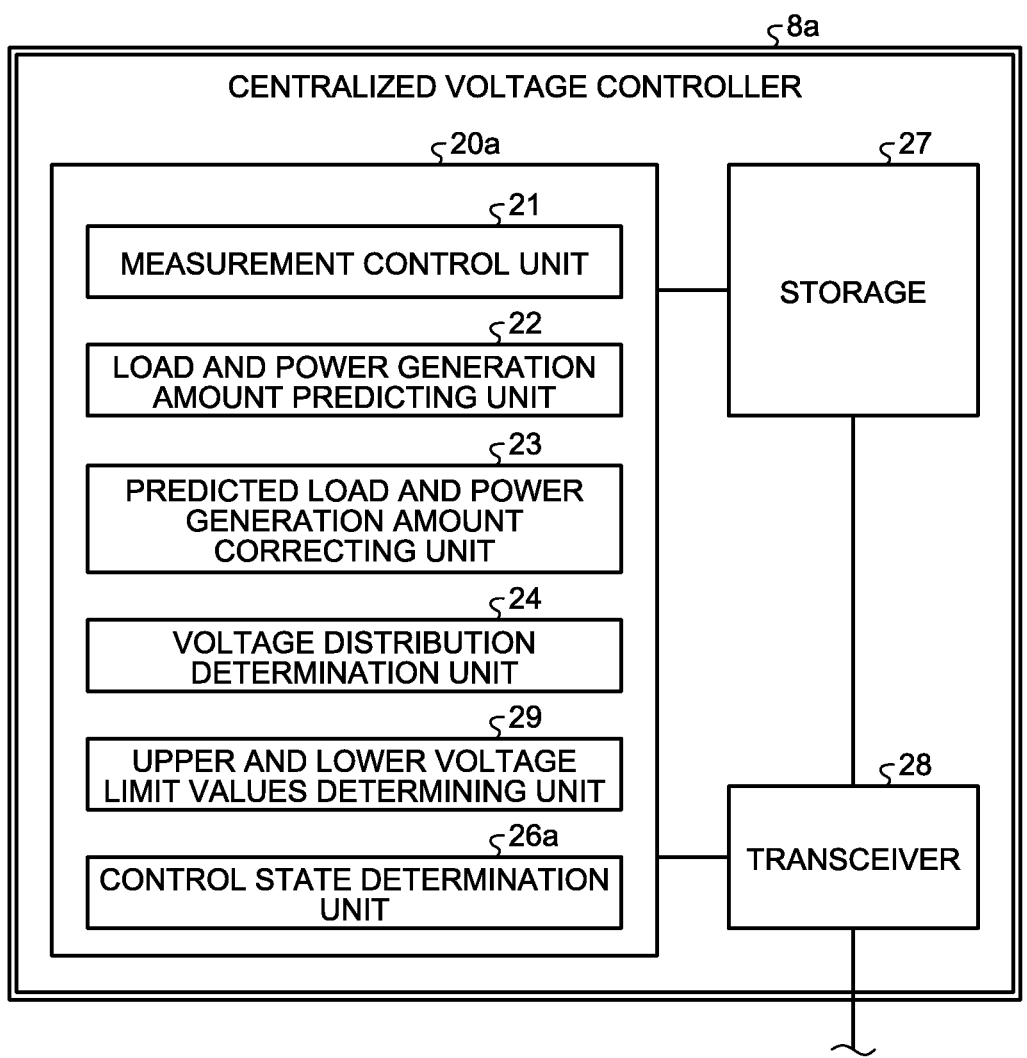
FIG. 8 is a diagram illustrating an example of the configuration of a centralized voltage controller according to a second embodiment.

FIG. 8 is a diagram illustrating an example of the configuration of a centralized voltage controller according to a second embodiment of the present invention. The configuration of a centralized voltage control system of the present embodiment is similar to the configuration of the centralized voltage control system of the first embodiment except that a centralized voltage controller 8a of the present embodiment is provided instead of the centralized voltage controller 8 of the first embodiment. A component having a function similar to that of the first embodiment will be assigned a reference symbol identical to that in the first embodiment so that a redundant description will be omitted. Differences from the first embodiment will be mainly described below.

As illustrated in FIG. 8, the centralized voltage controller 8a of the present embodiment is similar to the centralized voltage controller 8 of the first embodiment except that a control unit 20a is provided instead of the control unit 20 of the first embodiment. The control unit 20a of the present embodiment is similar to the control unit 20 of the first embodiment except that an upper and lower voltage limit values determining unit 29 and a control state determination unit 26a are provided instead of the tap position determination unit 25 and the control state determination unit 26 of the first embodiment, respectively. The configuration of a computer system implementing the centralized voltage controller 8a is similar to the configuration of the computer system implementing the centralized voltage controller 8 of the first embodiment.

In the first embodiment, the centralized voltage controller 8 gives the controlled amount used for each local voltage control unit to perform control as a command value. In the present embodiment, on the other hand, not the controlled amount itself but an upper voltage limit value and a lower voltage limit value (hereinafter also referred to as upper and lower voltage limit values) defining a voltage range in each local voltage control unit are given as a command value. Note that the command value may be the upper voltage limit value and the lower voltage limit value themselves, or may be information indicating the upper voltage limit value and lower voltage limit value. For example, a control target value and an insensible value may be given as the command value. Note that the upper voltage limit value and the lower voltage limit value themselves are included in the information indicating the upper voltage limit value and lower voltage limit value.

The upper and lower voltage limit values determining unit 29 that is a generation unit generates the command value to be given to each of the said plurality of local voltage control units on the basis of the controlled amount. In the present embodiment, the command value is the information indicating the upper voltage limit value and the lower voltage limit value. The control state determination unit 26a that is a determination unit obtains a position within the distribution system at which the amount of deviation of voltage from the proper voltage range is not improved, and determines a voltage controller corresponding to the obtained position to be a second voltage controller. As described in the first embodiment, the second voltage controller is the said voltage controller that does not perform control according to the command value.

Each local voltage control unit controlling the voltage controller of a transformer type controls the voltage controller that is the controlled object to keep the voltage between the upper and lower voltage limit values on the basis of the upper and lower voltage limit values given by the centralized voltage controller 8a. Each local voltage control unit updates and sets the upper voltage limit value and the lower voltage limit value every time a command of the upper and lower voltage limit values is received from the centralized voltage controller 8a. For example, on the basis of the upper and lower voltage limit values sent from the centralized voltage controller 8a, the local voltage control unit 11 adjusts the controlled amount of the voltage controller 1, that is, a change amount in the tap position with a local control period shorter than the centralized voltage control period so that the voltage on the secondary side of the voltage controller 1 falls between the upper and lower voltage limit values, that is, within a control target voltage range, during the period of the centralized voltage control period to which the upper and lower voltage limit values are applied. In the present embodiment, the centralized voltage controller 8a gives the command of the upper voltage limit value and the lower voltage limit value in such a manner to cause each local voltage control unit to perform control with the local control period shorter than the centralized voltage control period. Therefore, the centralized voltage control period of the present embodiment is typically longer than the centralized voltage control period of the first embodiment and can be set to, for example, one hour. The local control period has a value about one to five minutes, for example.

Figure 9:
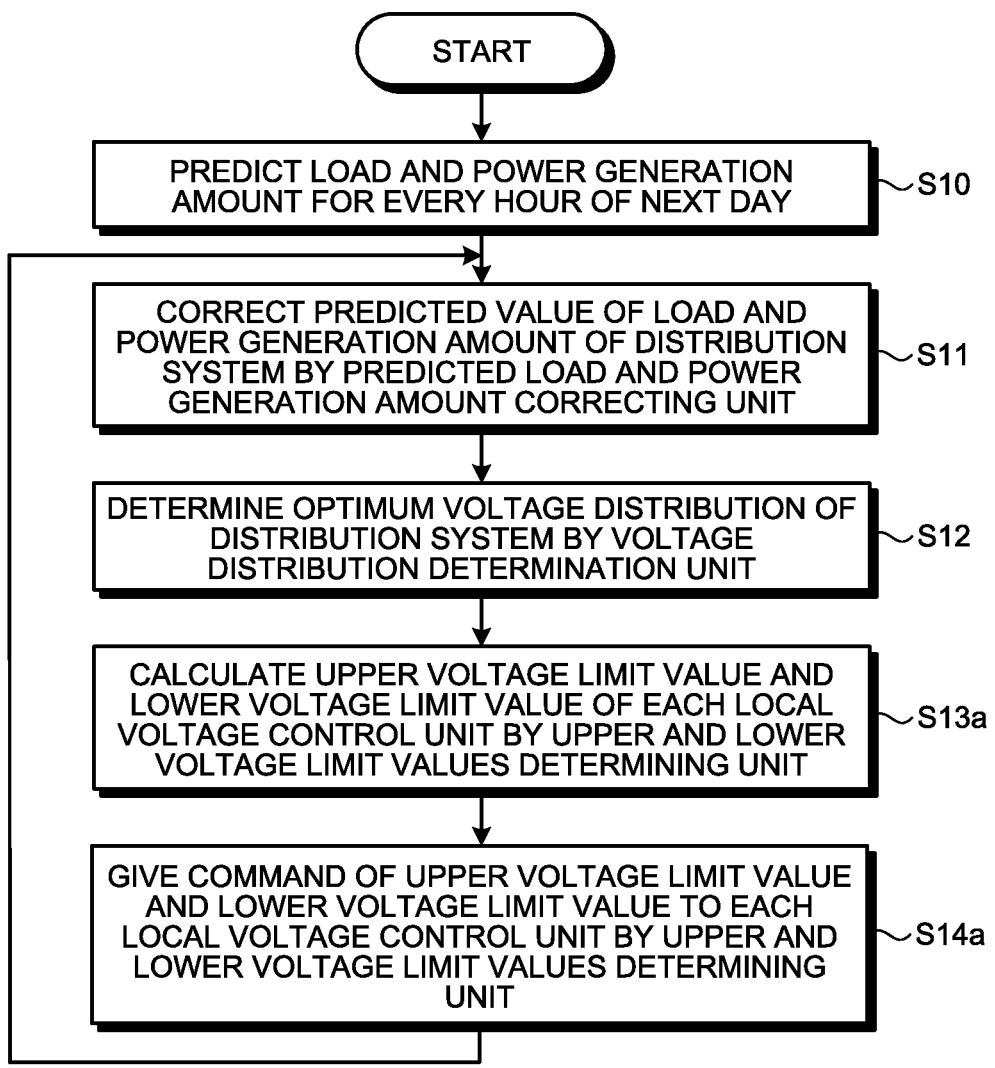
FIG. 9 is a flowchart illustrating an example of a centralized voltage control processing procedure of the second embodiment.

FIG. 9 is a flowchart illustrating an example of a centralized voltage control processing procedure of the present embodiment. Steps S10 to S12 are similar to those in the first embodiment. After step S12, the upper and lower voltage limit values determining unit 29 calculates the upper voltage limit value and the lower voltage limit value for each local voltage control unit in a future determined time period on the basis of the optimum voltage distribution of the distribution system (step S13a). The determined time period corresponds to the centralized voltage control period, for example.

Here, the processing in step S13a will be described in detail. First, for the voltage controller of a transformer type, for example, a responsible voltage control range is set so that the upper and lower voltage limit values can be determined on the basis of a minimum value (lm_min) of a lower voltage limit margin amount which is an absolute value of a difference between the optimum voltage and a lower limit value $V_{Hmin}$ of the high-voltage proper voltage range and a minimum value (um_min) of an upper voltage limit margin amount which is an absolute value of a difference between the optimum voltage and an upper limit value $V_{Hmax}$ of the high-voltage proper voltage range, within the responsible voltage control range.

Specifically, the voltage controller of a transformer type sets, as the responsible voltage control range, a range on the load side (downstream side) of the voltage controller, and in the case where another voltage controller exists on the load side, the voltage controller includes, in the responsible voltage control range, a part covering the power supply side of the other voltage controller.

The voltage controller of a reactive power regulation type sets as, the responsible voltage control range, a predetermined range on the power supply side (upstream side) of the voltage controller and a range on the load side of the voltage controller. Note that the responsible voltage control range is determined in order from one for the voltage controller on the downstream side, for example.

Figure 10:
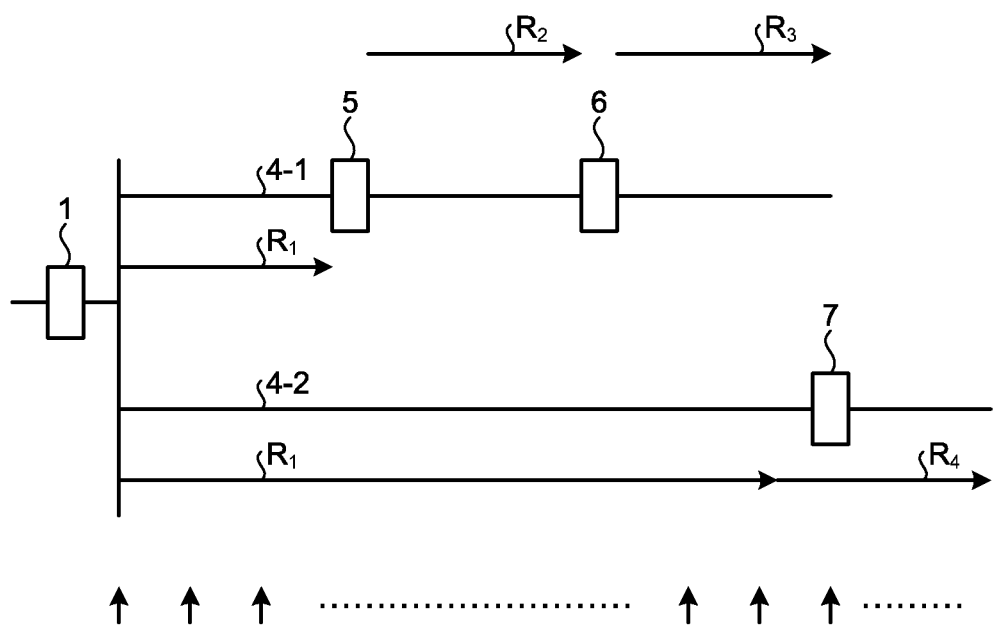
FIG. 10 is a chart illustrating an example of a responsible voltage control range.

FIG. 10 is a chart illustrating an example of the responsible voltage control range. FIG. 10 illustrates the distribution lines and the voltage controllers of the centralized voltage control system illustrated in FIG. 1, and omits illustration of the other components. Arrows illustrated at the bottom of FIG. 10 indicate an example of points in the distribution system at each of which the voltage is calculated in the calculation of the optimum voltage distribution in step S12. A responsible voltage control range $R_1$ illustrated in FIG. 10 is a responsible voltage control range for the voltage controller 1, a responsible voltage control range $R_2$ illustrated in FIG. 10 is a responsible voltage control range for the voltage controller 5, a responsible voltage control range $R_3$ illustrated in FIG. 10 is a responsible voltage control range for the voltage controller 6, and a responsible voltage control range $R_4$ illustrated in FIG. 10 is a responsible voltage control range for the voltage controller 7.

As illustrated in FIG. 10, the responsible voltage control range for the local voltage control unit 11 that is the voltage controller of a transformer type corresponds to a range from the load side of the voltage controller 1 to the voltage controllers 5 and 7, and includes the low voltage system (not illustrated in FIG. 10) connected to the distribution line 4-1. Within the responsible voltage control range for the local voltage control unit 11, "lm_min" is defined as the minimum value of the lower voltage limit margin amount which is the absolute value of the difference between the optimum voltage and the lower limit value $V_{Hmin}$ of the high-voltage proper voltage, and "um_min" is defined as the minimum value of the upper voltage limit margin amount which is the absolute value of the difference between the optimum voltage and the upper limit value $V_{Hmax}$ of the high-voltage proper voltage. At this time, the upper and lower voltage limit values determining unit 29 sets a value obtained by adding "um_min" to the value of the optimum voltage of the voltage controller 6 as the upper voltage limit value of the control target voltage range, and sets a value obtained by subtracting "lm_min" from the value of the optimum voltage of the voltage controller 1 as the lower voltage limit value of the control target voltage range.

In this way, the upper and lower voltage limit values are determined in consideration of not only the upper and lower voltage limit margin amounts in the vicinity of the installation location of the voltage controller 1 but also the upper and lower voltage limit margin amounts at each point within the responsible voltage control range of the voltage controller 1, so that the local voltage control unit 11 itself performs local control on the voltage controller 5 just within the control target voltage range but can maintain a proper voltage in a wider responsible voltage control range.

Returning to the explanation of FIG. 9, the upper and lower voltage limit values determining unit 29 next gives commands of the upper voltage limit value and the lower voltage limit value to each local voltage control unit controlling the voltage controller (step S14a), and returns to step S11. In the present embodiment, each of the command value given to the local voltage control unit controlling the voltage controller of a transformer type and the command value given to the local voltage control unit controlling the voltage controller of a reactive power regulation type corresponds to the upper voltage limit value and the lower voltage limit value.

As described above, the present embodiment is different from the first embodiment in that the upper voltage limit value and the lower voltage limit value are given as the command to each local voltage control unit. Unlike the first embodiment, the change amount in the tap position itself is not given as the command, so that the voltage controller has a possibility of performing proper control even when the period in which the command value, that is, the upper voltage limit value and the lower voltage limit value remain unchanged continuously is prolonged. In view of this situation, the present embodiment is adapted to determine the voltage controller that fails to perform proper control on the basis of whether or not the amount of voltage violation is improved. The control state determination unit 26a may perform the processing illustrated in FIG. 11 each time the measured information is received.

FIG. 11 is a flowchart illustrating an example of a procedure of the control state determination processing performed by the control state determination unit 26a of the present embodiment. The control state determination unit 26a may perform the processing illustrated in FIG. 11 each time the measured information is received or at regular intervals. The control state determination unit 26a determines whether or not a voltage violation is present (step S41). The control state determination unit 26a determines whether or not a voltage violation is present on the basis of the measured information, for example. If no voltage violation is present (No in step S41), the control state determination unit 26a ends the processing.

If a voltage violation is present (Yes in step S41), the control state determination unit 26a determines a voltage controller corresponding to the position at which the voltage violation is caused (step S42). Specifically, the control state determination unit 26a determines the position at which the voltage violation appears to correspond to a voltage controller that corresponds to the position at which the voltage violation is present, of the voltage controllers covered in its own responsible voltage control range.

Then, the control state determination unit 26a calculates an amount of the voltage violation at the position of the voltage violation, that is, an amount deviating from the proper voltage range (high-voltage proper voltage range), and determines whether or not the amount of voltage violation is improved (step S43). More specifically, the control state determination unit 26a holds the location in which the voltage violation has occurred and the amount of the voltage violation, and compares the latest amount of voltage violation Va with a past amount of violation Vb at the same position to calculate an absolute value of a difference between the two. When the absolute value of the difference between the two is larger than or equal to a threshold, the control state determination unit 26a determines that the amount of voltage violation is improved, but when the absolute value of the difference between the two is smaller than the threshold, the unit 26a determines that the amount of voltage violation is not improved. Alternatively, another method may be used to determine whether or not the amount of voltage violation is improved in such a way that it is determined that the amount of voltage violation is improved if the absolute value of the difference between the two is larger than or equal to a certain proportion of the past amount of violation Vb. Note that in a case where the amount of voltage violation Va and the amount of violation Vb are different in direction of violation, that is, in a case where one is ascribed to a violation with the voltage falling below the lower limit value and the other is ascribed to a violation with the voltage exceeding the upper limit value, the control state determination unit 26a determines in step S43 that the amount of voltage violation is improved. The past amount of violation may be an amount of voltage violation calculated the last time, or an amount of voltage violation calculated a certain time or more ago.

If the amount of voltage violation is not improved (No in step S43), the control state determination unit 26a determines whether or not a state in which the amount of voltage violation is not improved has continued for a certain time or longer (step S44). The certain time can be set to an arbitrary time length, for example, ten minutes.

If the state in which the amount of voltage violation is not improved has continued for the certain time or longer (Yes in step S44), the control state determination unit 26a excludes a relevant voltage controller from the controlled object (step S45), issues an alarm to an operator (step S46), and ends the processing. The control state determination unit 26a ends the processing in cases of "No" in step S41, "Yes" in step S43, and "No" in step S44.

The control state determination unit 26a may handle the excluded voltage controller again as the controlled object when a specified time or longer has elapsed after the voltage controller is excluded from the controlled object in step S45.

The amount of voltage violation must be improved when each local voltage control unit controls the voltage controller on the basis of the command value given by the centralized voltage controller 8a. However, as described in the first embodiment, the voltage controller may not properly perform control for some reason. In such a case, the amount of voltage violation is not improved. In the present embodiment, the centralized voltage controller 8a excludes the voltage controller from the controlled object when the state in which the amount of voltage violation is not improved continues for a determined time or longer. Therefore, the centralized voltage controller 8a performs centralized voltage control with excluding the voltage controller from the controlled object, so that the voltage violation is improved by another voltage controller. This can prevent prolongation of the voltage violation. Note that although the above embodiments describe the high voltage system as examples, the present invention can be similarly applied to the low voltage system.

The configurations illustrated in the above embodiments merely illustrate examples of the content of the present invention, and can thus be combined with other publicly known techniques or partially omitted and/or modified without departing from the scope of the present invention.

REFERENCE SIGNS LIST 1, 5, 6, 7 voltage controller; 2 bus line; 3-1, 3-2 circuit breaker; 4-1, 4-2 distribution line; 8, 8a centralized voltage controller; 9 communication network; voltage flow measuring device; 11, 15, 16, 17 local voltage control unit; 20, 20a control unit; 21 measurement control unit; 22 load and power generation amount predicting unit; 23 predicted load and power generation amount correcting unit; 24 voltage distribution determination unit; 25 tap position determination unit; 26, 26a control state determination unit; 27 storage; 28 transceiver; 29 upper and lower voltage limit values determining unit.

The invention claimed is:

1. A centralized voltage controller that is connected, via a communication network, to a plurality of local voltage control units controlling a plurality of voltage controllers, respectively, which is connected to a distribution line of a distribution system and controls voltage of the distribution line, the centralized voltage controller comprising:
   a calculation unit to calculate a controlled amount for each first voltage controller that is a voltage controller to be controlled among the plurality of voltage controllers, on the basis of a measured value of voltage at each point of the distribution line;
   a generation unit to generate a command value to be given to each of the plurality of local voltage control units on the basis of the controlled amount; and
   a determination unit to determine, on the basis of the command value, whether or not each of the plurality of voltage controllers is a second voltage controller that is a voltage controller that fails to perform control according to the command value, and set the plurality of voltage controllers except the second voltage controller to be the first voltage controller,
   wherein the command value is a change amount in a tap position, and
   in response to determining that the generation unit generated the same command value a determined number of times or more continuously, the determination unit determines that the voltage controller associated with the command value is the second voltage controller, wherein the determined number of times is determined based on a centralized voltage control period of the centralized voltage controller.

2. The centralized voltage controller according to claim 1, wherein the determination unit sets the voltage controller that has been determined to be the second voltage controller for a lapse of a determined time to be the first voltage controller.

3. The centralized voltage controller according to claim 1, wherein the plurality of local voltage control units includes a first unit that is a local voltage control unit that transmits a tap position set in the voltage controller to be controlled to the centralized voltage controller, and a second unit that is a local voltage control unit that does not transmit a tap position set in the voltage controller to be controlled to the centralized voltage controller.

4. A centralized voltage controller that is connected, via a communication network, to a plurality of local voltage control units controlling a plurality of voltage controllers, respectively, which is connected to a distribution line of a distribution system and controls voltage of the distribution line, the centralized voltage controller comprising:
 a calculation unit to calculate a controlled amount for each first voltage controller that is a voltage controller to be controlled among the plurality of voltage controllers, on the basis of a measured value of voltage at each point of the distribution line;
 a generation unit to generate a command value to be transmitted to each of the plurality of local voltage control units on the basis of the controlled amount; and
 a determination unit to determine, on the basis of change in the command value, whether or not each of the plurality of voltage controllers is a second voltage controller that is a voltage controller that fails to perform control according to the command value, and set the plurality of voltage controllers except the second voltage controller to be the first voltage controller,
wherein
 the command value is information indicating an upper limit value and a lower limit value of voltage, and
 the determination unit obtains a position in the distribution system at which an amount of deviation of voltage from a predetermined voltage range is not reduced, and determines that the voltage controller corresponding to the position is the second voltage controller.

5. The centralized voltage controller according to claim 4, wherein the determination unit sets the voltage controller that has been determined to be the second voltage controller for a lapse of a determined time to be the first voltage controller.

6. A centralized voltage control system comprising:
 a plurality of voltage controllers connected to a distribution line of a distribution system to control voltage of the distribution line;
 a plurality of local voltage control units to control the plurality of voltage controllers, respectively; and
 a centralized voltage controller connected to the plurality of local voltage control units via a communication network, wherein
the centralized voltage controller includes:
 a calculation unit to calculate a controlled amount for each first voltage controller that is a voltage controller to be controlled among the plurality of voltage controllers, on the basis of a measured value of voltage at each point of the distribution line;
 a generation unit to generate a command value to be given to each of the plurality of local voltage control units on the basis of the controlled amount; and
 a determination unit to determine, on the basis of the command value, whether or not each of the plurality of voltage controllers is a second voltage controller that is a voltage controller that fails to perform control according to the command value, and set the plurality of voltage controllers except the second voltage controller to be the first voltage controller,
wherein the command value is a change amount in a tap position, and
in response to determining that the generation unit generated the same command value a determined number of times or more continuously, the determination unit determines that the voltage controller associated with the command value is the second voltage controller, wherein the determined number of times is determined based on a centralized voltage control period of the centralized voltage controller.

7. The centralized voltage control system according to claim 6, wherein the determination unit sets the voltage controller that has been determined to be the second voltage controller for a lapse of a determined time to be the first voltage controller.

8. A centralized voltage control system comprising:
 a plurality of voltage controllers connected to a distribution line of a distribution system to control voltage of the distribution line;
 a plurality of local voltage control units to control the plurality of voltage controllers, respectively; and
 a centralized voltage controller connected to the plurality of local voltage control units via a communication network, wherein
the centralized voltage controller includes:
 a calculation unit to calculate a controlled amount for each first voltage controller that is a voltage controller to be controlled among the plurality of voltage controllers, on the basis of a measured value of voltage at each point of the distribution line;
 a generation unit to generate a command value to be transmitted to each of the plurality of local voltage control units on the basis of the controlled amount; and
 a determination unit to determine, on the basis of change in the command value, whether or not each of the plurality of voltage controllers is a second voltage controller that is a voltage controller that fails to perform control according to the command value, and set the plurality of voltage controllers except the second voltage controller to be the first voltage controller,
wherein
 the command value is information indicating an upper limit value and a lower limit value of voltage, and
 the determination unit obtains a position in the distribution system at which an amount of deviation of voltage from a predetermined voltage range is not reduced, and determines that the voltage controller corresponding to the position is the second voltage controller.

9. The centralized voltage control system according to claim 8, wherein the determination unit sets the voltage controller that has been determined to be the second voltage controller for a lapse of a determined time to be the first voltage controller.

* * * * *